C. W. McKINLEY.
BATTERY HOLDER.
APPLICATION FILED MAY 23, 1917.
1,291,049. Patented Jan. 14, 1919.
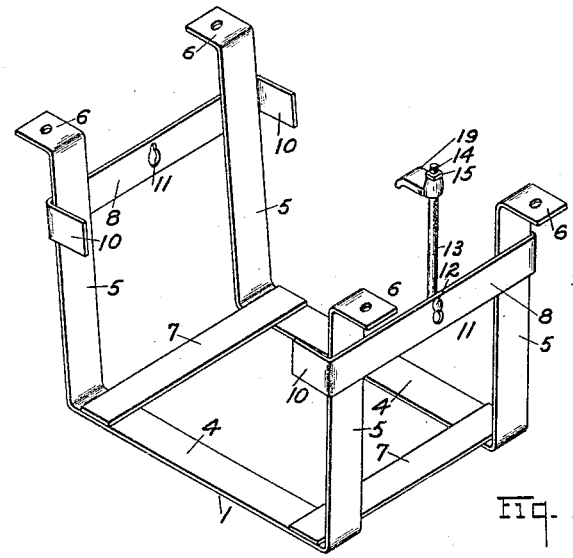
Fig. I.
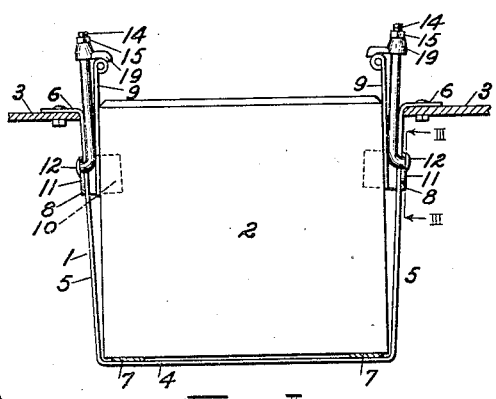
Fig. II.
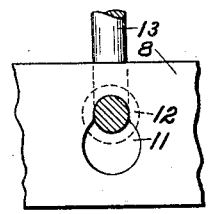
Fig. III.
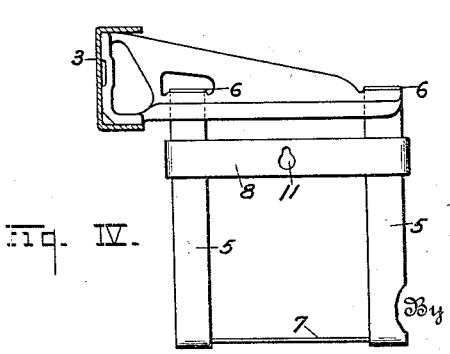
Fig. IV.
Inventor
Charles W. McKinley
Chester H. Braselton
Attorney.

UNITED STATES PATENT OFFICE.

CHARLES W. McKINLEY, OF TOLEDO, OHIO, ASSIGNOR TO THE WILLYS-OVERLAND COMPANY, OF TOLEDO, OHIO.

BATTERY-HOLDER.

1,291,049.
Specification of Letters Patent.
Patented Jan. 14, 1919.

Application filed May 23, 1917. Serial No. 170,477.

*To all whom it may concern:*

Be it known that I, CHARLES W. MCKINLEY, a citizen of the United States, residing at Toledo, in the county of Lucas and State of Ohio, have invented certain new and useful Improvements in Battery-Holders, of which I declare the following to be a full, clear, and exact description.

This invention relates to battery holders and particularly to a type of holder designed for removably holding in place the storage batteries used in connection with motor vehicles. The object of the invention is to provide a battery holder of simplified construction, such as may readily be applied to a motor vehicle, and to provide quickly releasable means for positively and rigidly retaining the battery in place in the holder.

Further objects and objects relating to economies of manufacture and details of construction, will definitely appear from the detailed description to follow.

I accomplish the objects of my invention by the devices and means described in the following specification. My invention is clearly defined and pointed out in the appended claim.

A structure constituting a preferred embodiment of my invention is illustrated in the accompanying drawing, forming a part of this specification, in which:

Figure I is a perspective view of a battery holder constructed in accordance with my invention;

Fig. II is a vertical, sectional view showing the battery holder attached to a portion of the automobile frame work;

Fig. III is an enlarged, detail, sectional view taken on line III—III of Fig. II; and Fig. IV is an end elevation showing the holder attached to a bracket.

In the drawings, similar reference characters refer to similar parts throughout the several views and the sectional views are taken looking in the direction of the little arrows at the ends of the section lines.

Considering the numbered parts of the drawing, 1 designates the holder as a whole; 2 the battery, and 3 that part of the car frame to which the holder is attached. The holder frame comprises two parallel straps having central portions 4 and upstanding end portions 5 bent approximately at right angles to the central portions. The ends of the straps are turned outwardly to form securing flanges 6, which are apertured to receive attaching screws or bolts. The central portions 4 of these straps are connected adjacent their ends by a pair of retaining cross-bars 7, and the upstanding end portions 5 are also connected adjacent their upper ends by cross-bars 8, the ends of which are bent inwardly to form the inwardly extending side flanges 10, which serve to prevent movement of the battery laterally of the holder. Each of these cross-bars is provided, at about the mid-point thereof, with a key-hole slot 11, which is adapted to receive the head 12 of the corresponding clamping bolt 13.

A clamping bolt 13 is provided at each side of the battery holder and the lower end of each bolt is turned at right angles to the body thereof and provided with a head which, as indicated above, is received in the key-hole slot in the corresponding cross-bar 8. The upper end of each clamping bolt 13 is threaded at 14 and receives a clamping lug 19 which, when the battery is in place in the holder, engages the handle of the battery to hold it firmly in place in the holder. Nuts 15, threaded, on the upper ends of the clamping bolts, draw the clamping lugs 19 firmly into position so that the battery is firmly and rigidly retained in place. In attaching the holder, the outturned flanges 6 are fastened to the adjacent parts of the car frame work in any suitable manner, as indicated in the drawing.

The battery is lowered into place in the holder and the clamping bolts 13 are positioned with their heads in the key-hole slots 11. The clamping lugs 19 are then turned to engage the handles of the battery, and the nuts 15 are tightened. This brings the clamping bolts upwardly so that the heads thereof are positioned in the smaller parts of the key-holed slots 11, and the clamping lugs 19 press downwardly on the handles 9 of the battery so that the clamping bolt is firmly locked in place and the battery is firmly and rigidly held in the battery holder. The inturned flanges 10 prevent lateral movement of the battery while the clamping bolts prevent any vertical movement thereof. In removing the battery, the nuts 15 are loosened and the lugs 19 are turned on the bolts so as to remove them from the handles 9, and the battery can then be lifted from its place in the holder in the usual manner.

I have found that the specific embodiment of my invention, which I have here illustrated and described, is very desirable from many standpoints, but I am also aware that this embodiment may be changed considerably without departing from the spirit of my invention, and therefore, I desire to claim my invention broadly as well as specifically as will appear from the appended claim.

Having thus described my invention, what I claim as new and desire to secure by Letters Patent is:

A battery holder, comprising a plurality of connected members, one or more of which is provided with a slot having a reduced portion at one side thereof, a bolt having a lateral projection and a head thereon insertible through said slot, said projection being adapted to extend through the reduced portion of the slot and held against displacement by said head, and means adjustable upon the bolt adapted to engage the battery for locking the same upon the support.

In testimony whereof I affix my signature.

CHARLES W. McKINLEY.